United States Patent
Schroeder et al.

(10) Patent No.: US 6,272,747 B1
(45) Date of Patent: Aug. 14, 2001

(54) METHOD OF USING HORIZONTAL MOUNT BRACKET SYSTEM FOR AUTOMATICALLY SETTING AN AIR GAP

(75) Inventors: Thaddeus Schroeder, Rochester Hills; Robin Stevenson, Bloomfield, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/630,947

(22) Filed: Aug. 3, 2000

Related U.S. Application Data

(62) Division of application No. 09/372,952, filed on Aug. 12, 1999, now Pat. No. 6,139,211.

(51) Int. Cl.$^7$ ..................................................... B21K 3/00
(52) U.S. Cl. ............................. 29/888.01; 29/559; 403/13
(58) Field of Search ............................. 29/888.01, 401.1, 29/559; 403/13

(56) References Cited

U.S. PATENT DOCUMENTS

| | | | |
|---|---|---|---|
| 3,552,969 | 1/1971 | Orenick et al. | 247/74 |
| 5,435,202 | * 7/1995 | Kitamura | 74/502.4 |
| 5,588,334 | * 12/1996 | Lu et al. | 74/502.4 |
| 5,951,191 | 9/1999 | Schroeder et al. | 403/13 |
| 5,967,473 | 10/1999 | Singbartl | 248/200 |
| 6,062,529 | 5/2000 | Stevenson et al. | 248/674 |
| 6,070,865 | 6/2000 | Schroeder et al. | 269/47 |

OTHER PUBLICATIONS

Schroeder et al, "Horizontal–Mount Bracket System for Holding and Locking Sensor Position," USSN 09/316,370 filed May 21, 1999.

Schroeder et al, "Side–Mount Bracket System for Providing a Locked Sensor Position," USSN 09/361,839 filed Jul. 27, 1999.

Stevenson et al, "Two–Component Bracket and Drive Washer Combination for Automatically Setting an Air Gap," USSN 09/186,560 filed Nov. 5, 1999.

* cited by examiner

*Primary Examiner*—I Guda Rosenbaum
(74) *Attorney, Agent, or Firm*—Margaret A. Dobrowitsky

(57) ABSTRACT

A horizontal-mount bracket system for holding sensor position with respect to a horizontal-mount bracket, wherein facial interaction between the bracket and the sensor body provides automatic setting of the air gap which setting is preserved such that if the sensor is ever reinstalled, the air gap is precisely reset to its original value. A multi-component bracket has first and second bracket components which lay juxtaposed, one atop the other. The first bracket component has a first sensor opening and the second bracket component has a second sensor opening wherein initially the first and second sensor openings are mutually communicating and aligned just sufficiently so that the sensor body is free to vertically move therein. The sensor body is placed into a sensor port of an engine block so that the tip of the sensor body rests upon a surface of a reluctor. With the multi-component bracket resting upon a horizontal surface of the engine block, the first bracket component is laterally displaced relative to the second bracket component, causing the first and second sensor openings to be horizontally displaced relative to each other and inscribe the sensor body at an inclined angle which causes the tip to be separated from the reluctor by a predetermined air gap. Alternatively, the first and second bracket components may be inclinably slid relative to each other to thereby cause the sensor tip to be moved away from the reluctor.

6 Claims, 7 Drawing Sheets

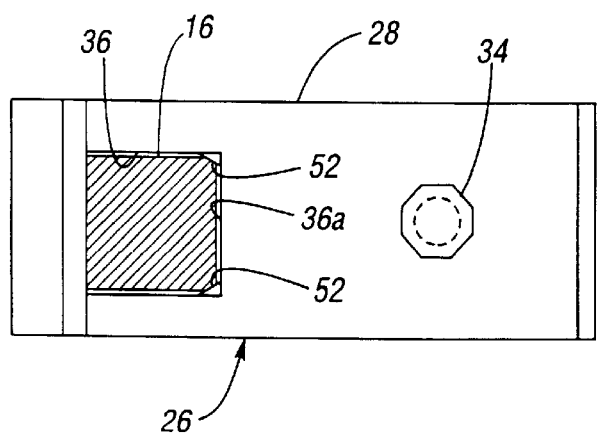
Fig. 6
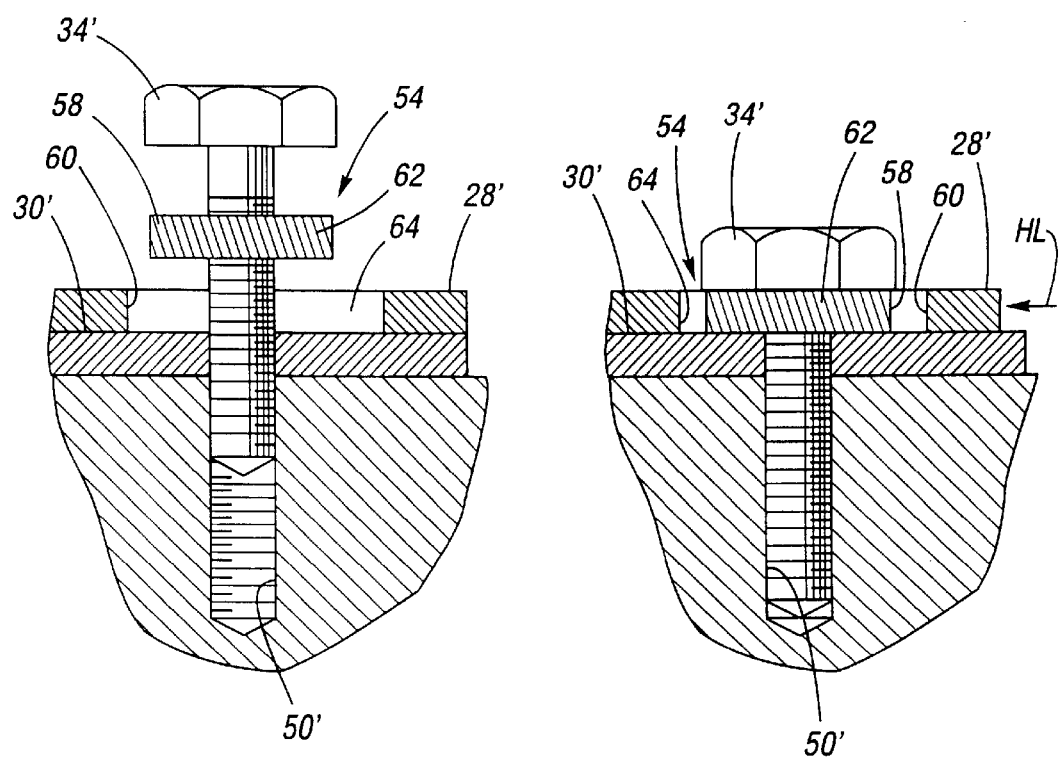
Fig. 7a
Fig. 7b

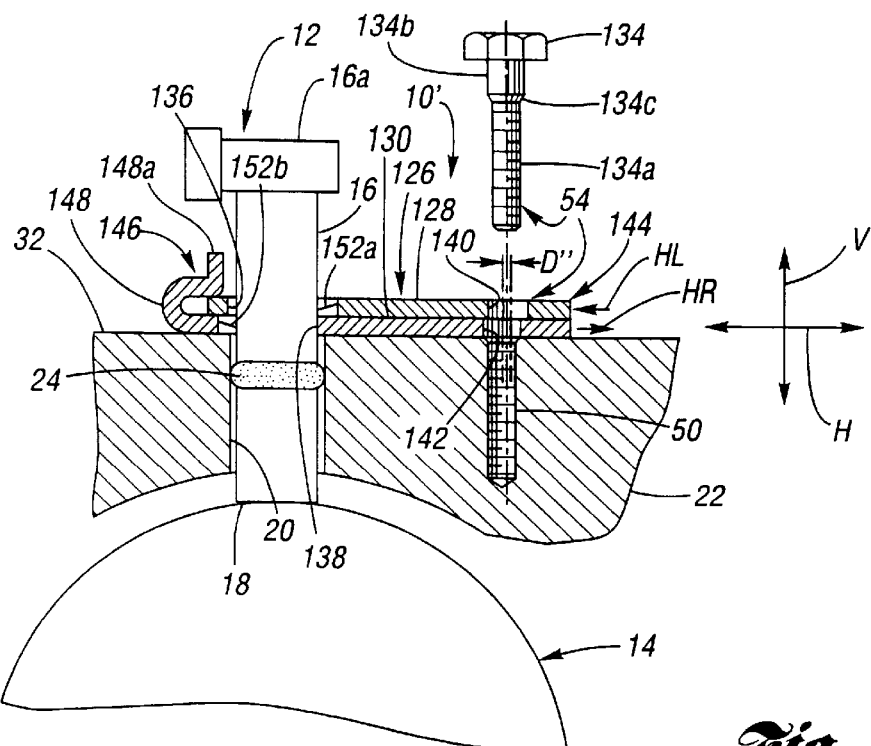
Fig. 8
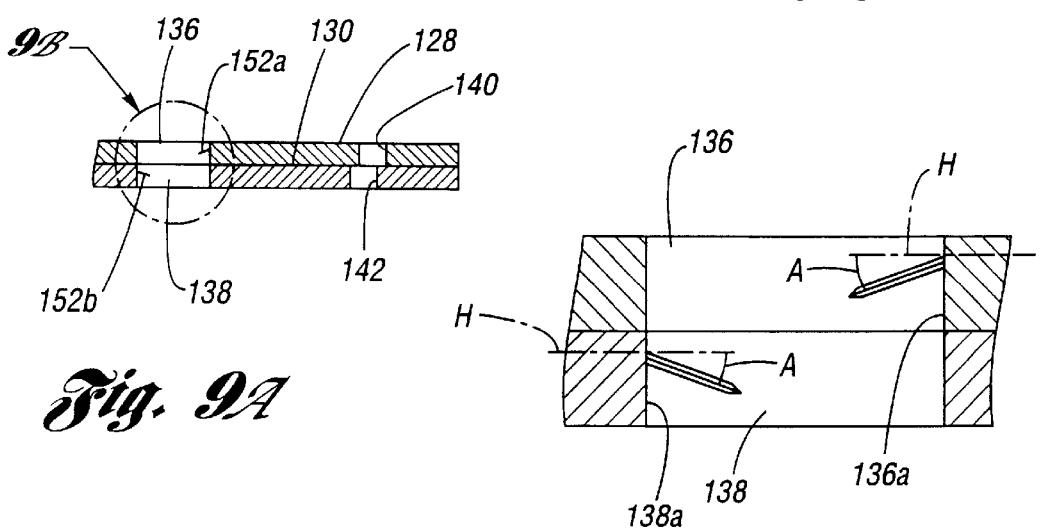
Fig. 9A
Fig. 9B
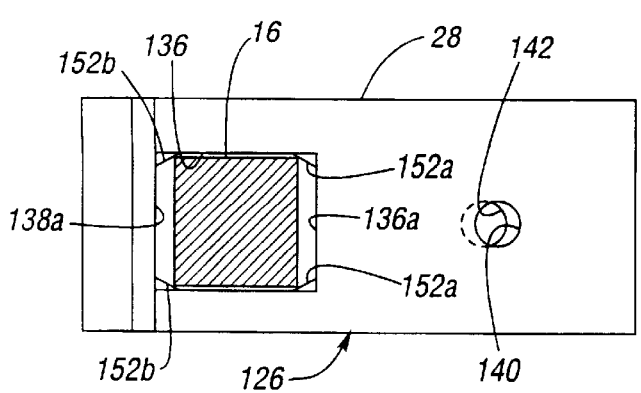
Fig. 10

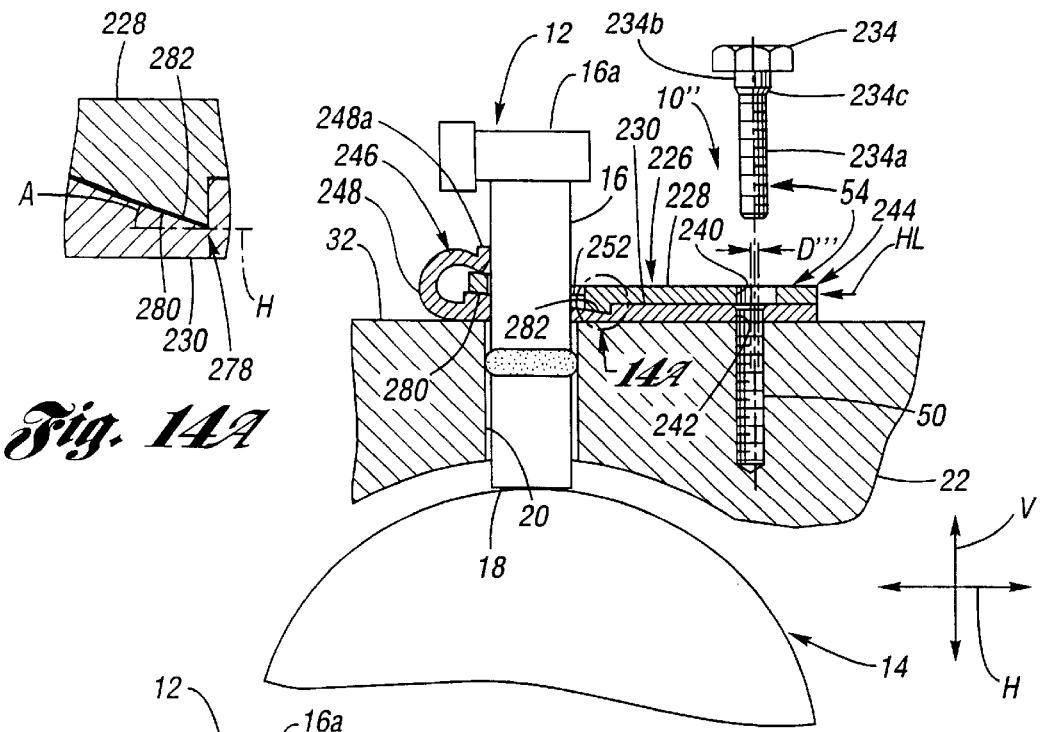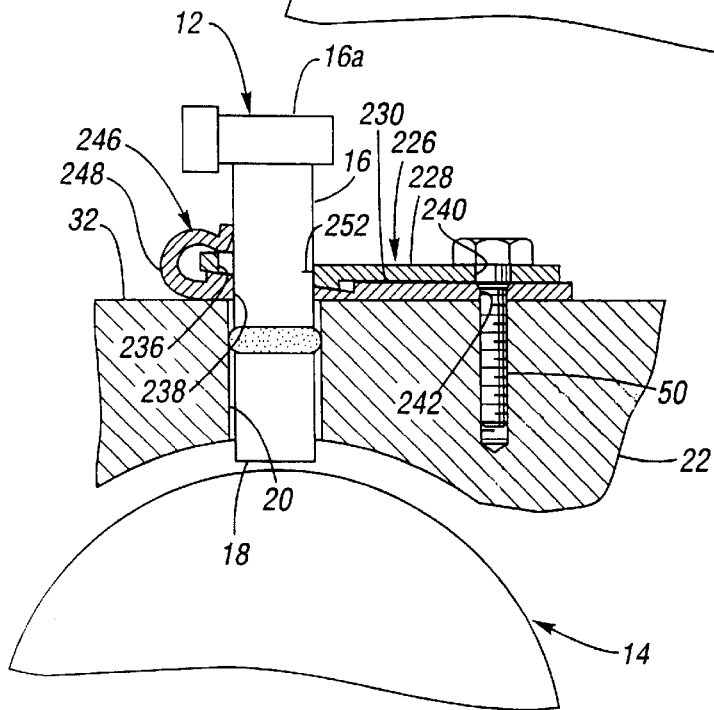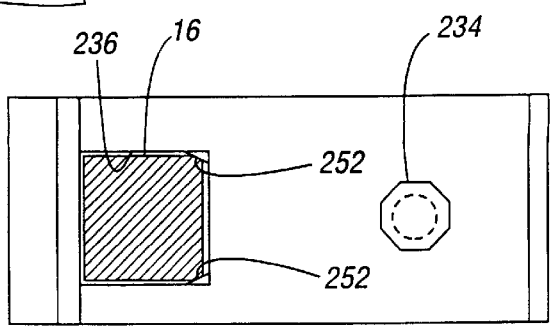

METHOD OF USING HORIZONTAL MOUNT BRACKET SYSTEM FOR AUTOMATICALLY SETTING AN AIR GAP

This Application is a division of Ser. No. 09/372,952 filed Aug. 12,1999 U.S. Pat. No. 6,139,211

TECHNICAL FIELD

The present invention relates to brackets for holding a first object with respect to a second object. More particularly, the present invention relates to a horizontal-mount bracket for precisely locating a sensor relative to an object to be sensed. Still more particularly, the present invention relates to a horizontal-mount bracket system, wherein facial interaction between the bracket and the body of the sensor results in the sensor being fixed positionally with respect to the bracket, and further results in a predetermined air gap being set between the sensor and the object to be sensed.

BACKGROUND OF THE INVENTION

Magnetic sensors operate on the principle of detecting magnetic flux density modulation caused by the movement of appropriately configured reluctors (or targets). The magnetic sensor must be affixed very close to the reluctor since its sensitivity decreases very rapidly with the size of the air gap between the reluctor and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the reluctor as it spins in relation to the magnetic sensor. Both of these factors are often unacceptable in critical engine control and diagnostic applications.

It may at first glance appear that there would be no problem whatsoever to choose and achieve an appropriate air gap between the magnetic sensor and the reluctor. However, in the majority of production cases, the stack-up of tolerances of the many different components randomly influence the net size of the air gap, which consequently precludes achieving, at each assembly, a precisely predetermined air gap by mere assembly of the parts. As a result, because of the random variations caused by accumulation of tolerances, mere assembly of the parts risks damaging interference between the magnetic sensor and reluctor on the one hand, and inaccurate readings associated with too large an air gap on the other hand. To lessen all the tolerances so that mere assembly assures, at each assembly, the optimum air gap is physically unrealistic and involves inordinate costs associated with manufacturing such precise parts.

The majority of magnetic sensors used in automotive applications involve non-adjustable air gap placement wherein the stack-up of tolerances causes deviation from the optimal air gap. For example, a rigid bracket is affixed to the body of a magnetic sensor. The magnetic sensor is placed into a sensor port in the engine block. and the bracket is bolted, via a bolt hole in the bracket, to a threaded mounting hole in a mounting surface of the engine block. When the bracket is bolted, the length of the sensor body from the bolt hole of the bracket to the sensor tip determines the air gap with respect to the reluctor which air gap is affected by the stack-up of tolerances. Even though subject to tolerance related placement inaccuracy, this structural mounting methodology is used -widely because of the simplicity of the hardware, and ease of assembly and service.

In situations where air gap variation cannot be tolerated, the air gap is preset during magnetic sensor installation by means of an adjustable bracket, often referred to as a "side-mount" bracket. The adjustability of side-mount brackets resides in a bolt slot which allows for the bracket to be adjusted along the slot elongation relative to the threaded mounting hole of the mounting surface.

In one form of operation of the side-mount bracket, the sensor body is placed into the sensor port of the enitine block such that the sensor tip is allowed to touch the surface of the reluctor, and then it is withdrawn a distance equal to the predetermined optimum air gap. This method is more time consuming and is error prone.

In another form of operation of the side-mount bracket, a gauging layer of soft, abradable material is placed onto the sensor tip, wherein the thickness of the gauging layer is equal to the optimum air gap. The gauging layer may be either attached to the sensor body or be a part thereof, such as a protuberance, provided the sensor body is of a soft material. Now, the installer need merely place the sensor body into the sensor port until the gauging layer touches the reluctor, and then tighten the bolt on the mounting surface to thereby hold the sensor body at this position. During initial rotation of the reluctor, a portion of the gauging layer is sacrificial to abrasion due to reluctor runout or differential thermal expansion without damage being incurred to the sensor body or the reluctor. This abrasion can undesirably result in particles being introduced into the engine oil.

In the event the magnetic sensor must be re-installed, an abraded gauging layer cannot again provide position location for the sensor tip, as it was formerly able to do when it was unabraded. Therefore, before dismounting the magnetic sensor, the bracket must be marked to indicate the correct position of the sensor body relative to the bracket so that when the new magnetic sensor is re-installed, its position on the bracket can be alignably sighted—not an exact procedure. Indeed, rather than try to reinstall the old, but still usable, sensor using the sighting method to reset the air gap, a technician would rather install a new sensor having the abradable layer intact, thereby circumventing the error prone sighting step otherwise needed to reinstall the old, but usable, sensor. This results in waste of otherwise good sensors and unnecessary expense for the customer or warranty provider.

Horizontal-mount brackets differ from side-mount brackets, in that a "horizontal" surface, ie., a surface normal to the vertical axis of the sensor port, is used to mount the bracket. The horizontal mount bracket involves convenience in terms of manufacture, installation and space savings as compared to the side-mount bracket. which requires the presence of a vertical surface adjacent the sensor port.

What remains needed in the art, is some way to enable a horizontal-mount bracket to facially interact with a sensor body, wherein the sensor is affixed positionally and wherein a predetermined air gap is set automatically.

SUMMARY OF THE INVENTION

The present invention is a horizontal-mount bracket system for holding sensor position with respect to a horizontal-mount bracket, wherein facial interaction between the bracket and the sensor body provides automatic setting of the air gap which setting may be preserved such that if the sensor is ever reinstalled, the air gap is precisely reset to its original value.

The horizontal-mount bracket system according to the present invention includes a multi-component bracket, having first and second bracket components which lay juxtaposed, one atop the other. The first bracket component has a first sensor opening and a first bolt hole; the second bracket component has a second sensor opening and a second bolt hole. The spacing between the first sensor opening and the first bolt hole is different from the spacing between the second sensor opening and the second bolt hole. Preferably, the distal ends (adjacent the first and second bolt holes) of the multi-component bracket are free. while the near ends (adjacent the first and second sensor openings) are vertically held but horizontally slidable, as for example by a fold-over of the second bracket component with respect to the first bracket component. The first and second sensor openings mutually communicate and the first and second bolt holes mutually communicate wherein initially the first and second sensor openings are mutually communicating and mutually aligned, preferably just sufficiently, so that the sensor body is free to vertically move therein and second bolt holes are mutually misaligned by an offset distance. The first bracket component has at least one cutting tooth at the first sensor opening which is oriented at a predetermined acute pitch angle with respect to a horizontal axis.

Preferably, the sensor body is placed trappingly into the first and second sensor openings of the multi-component bracket as part of the manufacturing process. This not only ensures that the sensor will remain permanently associated with respect to the multi-component bracket, but further ensures the orientation of the sensor with respect to the multi-component bracket will be correct.

Operationally, the sensor body is placed into a sensor port of an engine block so that the tip of the sensor body rests upon a surface of a reluctor. With the multi-component bracket resting upon a horizontal surface of the engine block, the first and second bolt holes are jointly placed over a threaded mounting hole of the horizontal surface. The threaded shank of a tapered bolt is then passed freely through the first and second bolt holes without displacing them, and then threaded into the threaded mounting hole. When a larger diameter neck of the tapered bolt encounters the first bolt hole, the first bracket component is laterally displaced relative to the second bracket component (the second bracket component optionally not moving) along the horizontal axis (parallel to the horizontal surface). This displacement causes the first and second sensor openings to be horizontally displaced relative to each other wherein the respective perimeters thereof forcibly abut respectively opposite sides of the sensor body, thereby causing the at least one cutting tooth of the first bracket component to cut into the softer sensor body. Because the at least one tooth has a predetermined pitch angle relative to the horizontal axis, the sensor body is caused to move along a vertical axis which is perpendicular to the horizontal axis determined by the pitch angle.

The distance of movement of the sensor body along the vertical axis is given by: $D*\tan(A)=G$, wherein D equals a distance of movement of the at least one tooth with respect to the sensor body along the horizontal axis after the at least one tooth has engaged the sensor body, A is the pitch angle of the at least one tooth, and G is the distance of movement of the sensor body along the vertical axis which is equal to the desired optimum air gap.

In a second embodiment of the present invention, a multi-component bracket is provided wherein the first bracket component has at least one first tooth at the first sensor opening and the second bracket component has at least one second tooth at the second sensor opening. Each of the at least one first and second teeth have the aforesaid pitch angle, which, as the first and second bracket components slide relative to each other, results in the teeth cutting into the softer sensor body, whereby the sensor body moves along the vertical axis until the desired optimum air gap is established.

In a third embodiment of the present invention the first bracket component is provided with at least one tooth at the first sensor opening which is oriented parallel to the horizontal axis. Each of the first and second bracket components have an inclined plane interface at the first and second sensor openings, in operation, as the first and second sensor bracket components move relative to each other, the at least one tooth cuts into the softer bracket body thereby holding the sensor body affixed thereto. Further, the inclined plane interface results in the first bracket component moving in the vertical axis as it slides inclinably in relation to the second bracket component. The vertical movement is predetermined to result in the sensor body moving along the vertical axis until the predetermined optimum air gap is established.

Accordingly, it is an object of the present invention to provide a horizontal-mount bracket system which automatically establishes a predetermined air gap between a sensor body and an object to be sensed and affixes the sensor body positionally thereat.

It is an additional object of the present invention to provide a horizontal mount bracket system which automatically sets a predetermined air gap, which setting is preserved such that if the sensor is ever reinstalled the air gap is precisely reset to its original value.

These, and additional objects, advantages, features and benefits of the present invention will become apparent from the following specification.

BRIEF DESCRIPTION OF THE DRAWINGS

FIG. 6 is a partly sectional top view showing the first embodiment and a sensor body after displacement by a tapered bolt displacement mechanism.

FIGS. 7A and 7B are partly sectional side views of the first embodiment, wherein an alternative displacement mechanism is depicted.

FIG. 8 is a partly sectional side view of a second embodiment of the horizontal-mount bracket system according to the present invention shown prior to displacement.

FIG. 9A is a partly sectional side view of first and second bracket components according to the second embodiment.

FIG. 9B is a detail view at circle 9B of FIG. 9A.

FIG. 10 is a partly sectional top view showing the second embodiment and a sensor body prior to displacement.

FIG. 14 is a partly sectional side view of a third embodiment of the horizontal-mount bracket system according to the present invention shown prior to displacement.

FIG. 14A is a detail view at circle 14A of FIG. 14.

FIG. 16 is a partly sectional side view of the second embodiment of the horizontal-mount bracket system according to the present invention shown after displacement by a displacement mechanism.

FIG. 17 is a partly sectional top view showing the third embodiment and a sensor body after displacement.

DESCRIPTION OF THE PREFERRED EMBODIMENT

Figure 1:
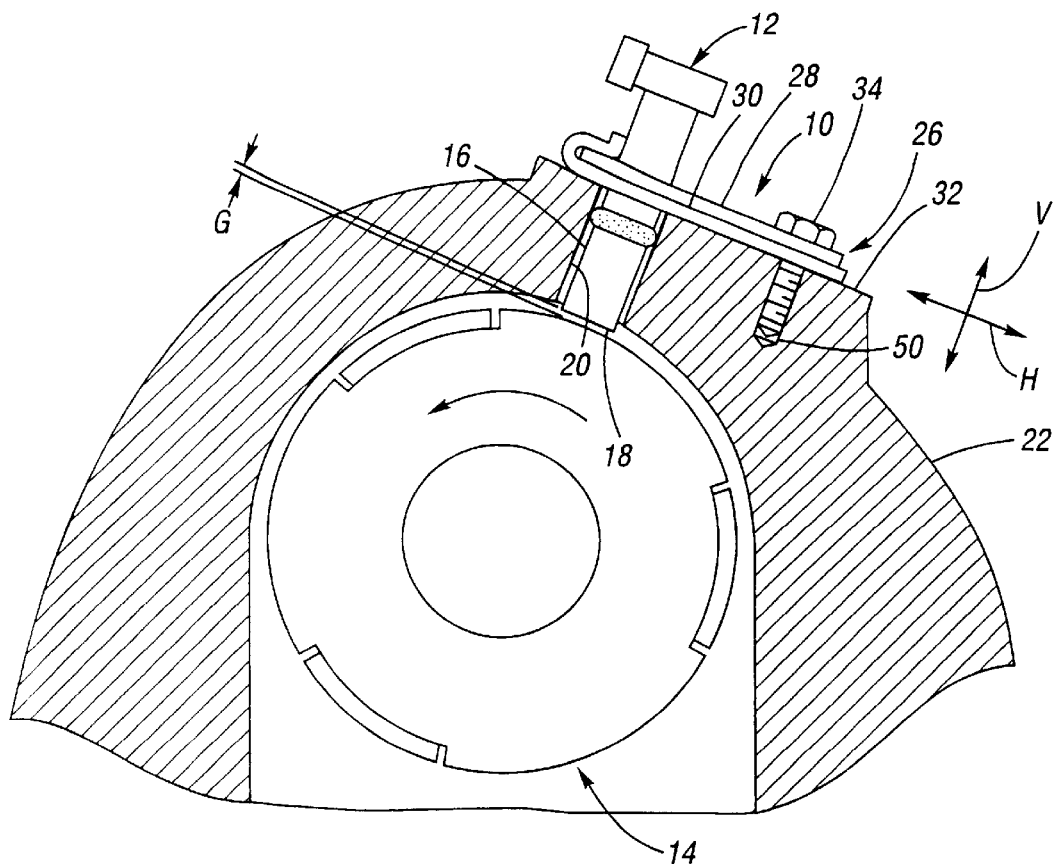
FIG. 1 is a partly sectional side view of the horizontal-mount bracket system according to the present invention, shown in a typical environment of operation wherein a magnetic sensor is spaced from a reluctor a distance equal to an automatically established optimum air gap.

Referring now to the Drawings, FIG. 1 generally depicts a first embodiment of the horizontal-mount bracket system 10 according to the present invention in an exemplar environment of operation wherein the horizontal-mount bracket system serves to locate a magnetic sensor 12 with respect to a reluctor 14. In this regard, the magnetic sensor 12 has a sensor body 16 which includes a sensor tip 18. The sensor tip 18 extends into a sensor port 20 of an engine block 22 and is spaced from the reluctor 14 a predetermined distance equal to an optimum air gap G which provides optimal sensing performance by the magnetic sensor of magnetic field variations as the reluctor spins.

A horizontal-mount multi-component bracket 26 (hereafter, simply "multi-component bracket") of the horizontal-mount bracket system 10 is composed of a first bracket component 28 and a second bracket component 30 which lie juxtaposed flatly on a flat horizontal surface 32 which is oriented parallel to a horizontal axis H and normal to the sensor port 20 (the cylindrical axis of which is along the vertical axis V). A tapered bolt 34 secures the multi-component bracket 26 to the horizontal surface 32.

Figure 4:
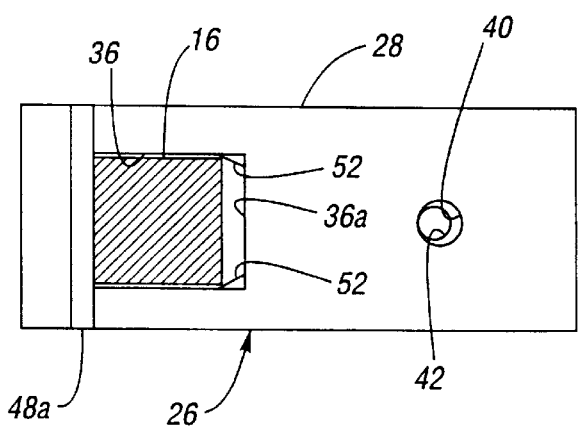
FIG. 4 is a partly sectional top view showing the first embodiment and a sensor body prior to displacement.
Figure 5:
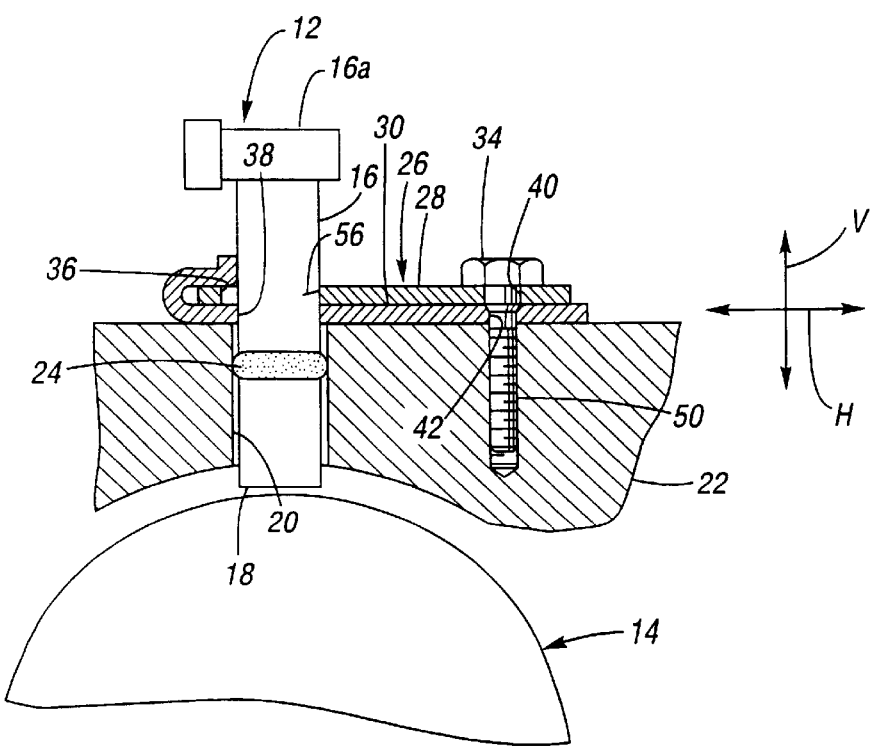
FIG. 5 is a partly sectional side view of the first embodiment of the horizontal-mount bracket system according to the present invention shown after displacement by a tapered bolt displacement mechanism.

Preferably, the sensor body 16 is placed trappingly into the first and second sensor openings 36, 38 of the multi-component bracket 26 as part of the manufacturing process. This not only ensures that the sensor 12 will remain permanently associated with respect to the multi-component bracket 26, but further ensures the orientation of the sensor with respect to the multi-component bracket will be correct. The former feature facilitates installation at an assembly plant, the latter feature ensures that a directionally sensitive sensor will be properly oriented with respect to the direction of rotation of the reluctor 14. For example, the sensor body 16 may be trapped on the multi-component bracket 26 between a gasket 24 and the sensor head 16a, each of which having a diameter exceeding the diameters of the first and second sensor openings 36, 38; and the sensor body is prevented for rotating by complementary non-circular cross-sections of the sensor body and the first and second sensor openings (see FIG. 4). It is to be understood that those ordinarily skilled in art may utilize any known modality to trap and/or permanently orient the sensor with respect to the multi-component bracket, and that the various views of the present disclosure are by way of exemplification and not limitation.

The multi-component bracket 26 automatically sets the air gap G and holds the sensor body 16 thereat via a facial interaction between the multi-component bracket and the sensor body, as will now be detailed with reference to FIGS. 2 through 6 according to the first embodiment.

Referring now to FIGS. 2 through 7B, the first bracket component 28 has a first sensor opening 36 and a first bolt hole 40. The second bracket component 30 has a second sensor opening 38 and a second bolt hole 42. The spacing between the first sensor opening 36 and the first bolt hole 40 is a first distance, and the spacing between the second sensor opening 38 and the second bolt hole 42 is a second distance, wherein the first and second distances are different by an offset distance D' (see FIG. 2). Preferably, the distal ends 44 (adjacent the first and second bolt holes) of the multi-component bracket 26 are free, while the near ends 46 (adjacent the first and second sensor openings) are vertically held but horizontally slidable, as for example by a fold-over 48 of the second bracket component with respect to the first bracket component. The first and second sensor openings mutually communicate and the first and second bolt holes mutually communicate wherein initially the first and second sensor openings are mutually aligned such that the sensor body 16 is free to move in the vertical axis V and the first and second bolt holes are mutually misaligned by an amount equal to the offset distance D'. Preferably, the sensor body 16 is trapped and oriented with respect to the first and second sensor openings 36, 38 during manufacture. An abutment 48a is formed at the fold-over 48 for keeping the sensor body vertically oriented during and after displacement of the first and second bracket components.

The first sensor opening 36 is provided with an opposed pair of teeth 52 located at an approaching perimeter 36a thereof, wherein the "approaching perimeter" is defined as the perimeter of the first sensor opening which approaches the sensor body 16 when the first and second bracket components are mutually displaced by a displacement mechanism 54. This displacement causes the first and second sensor openings 36, 38 to be horizontally displaced relative to each other, wherein the respective perimeters thereof forcibly abut respectively opposite sides of the sensor body, thereby causing the teeth 52 of the first bracket component 28 to cut into the softer sensor body 16. Because the teeth 52 each have a predetermined pitch angle A relative to the horizontal axis (see FIG. 3B), the sensor body 16 is caused to move along the vertical axis V determined by the displacement D occurring after the teeth have engaged the sensor body.

The distance of movement of the sensor body along the vertical axis V is given by: $D*\tan(A)=G$, wherein D is the relative displacement of the first bracket component 28 relative to the second bracket component after the teeth 52 have engaged the sensor body 16 along the horizontal axis H, A is the pitch angle of each of the teeth 52, and G is the distance of movement of the sensor body along the vertical axis V which is equal to the desired optimum air gap.

Installation of the sensor body according to the first embodiment is as follows.

Figure 2:
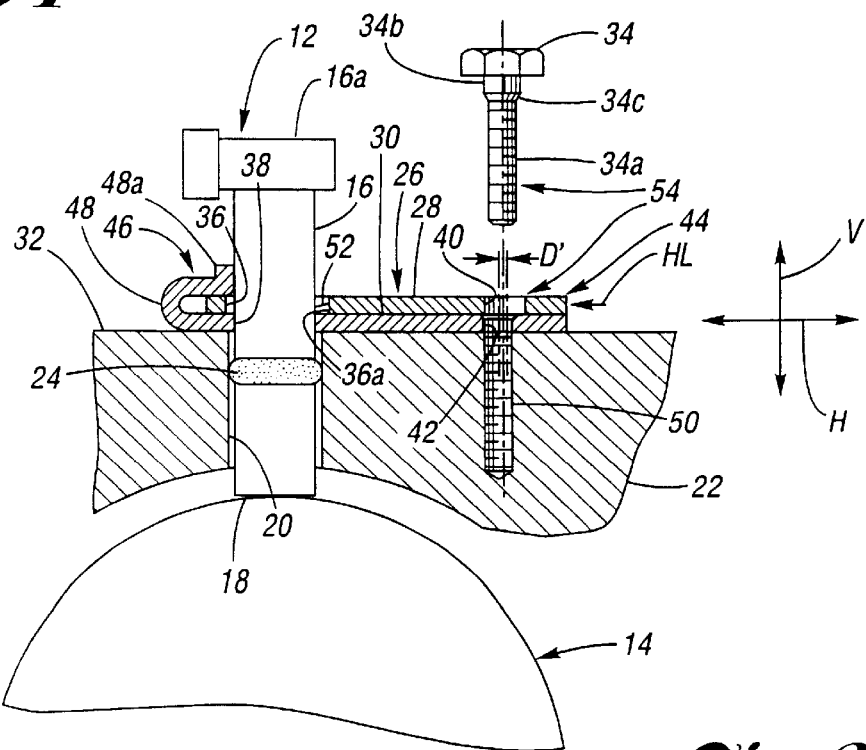
FIG. 2 is a partly sectional side view of a first embodiment of the horizontal-mount bracket system according to the present invention shown prior to displacement.
Figure 3A:
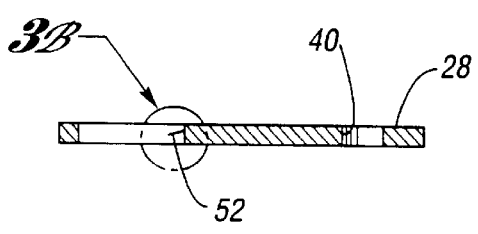
FIG. 3A is a partly sectional side view of a first bracket component according to the first embodiment.
Figure 3B:
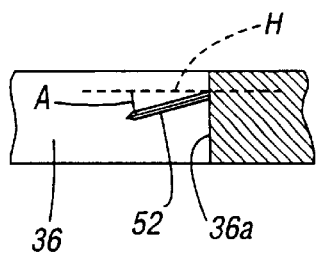
FIG. 3B is a detail view at circle 3B of FIG. 3A.

As shown at FIG. 2, the sensor body 16, tip 18 first, is placed into the sensor port 20 so that the tip comes to rest upon a surface of the reluctor 14. With the multi-component bracket 26 resting upon the horizontal surface 32, the first and second bolt holes 40, 42 are jointly placed over the threaded mounting hole, wherein the first and second bolt holes are misaligned relative to each other by the offset distance D'. The tapered bolt 34 has a threaded shank 34a, a larger diameter neck 34b and a taper 34c therebetween.

Figure 11:
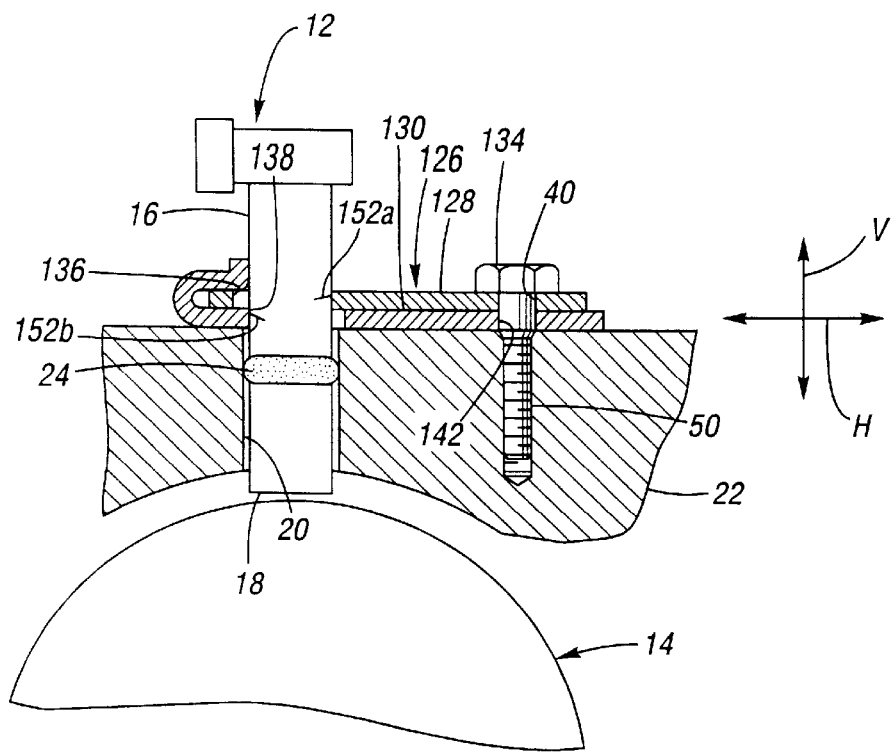
FIG. 11 is a partly sectional side view of the second embodiment of the horizontal-mount bracket system according to the present invention shown after displacement by a displacement mechanism.
Figure 12:
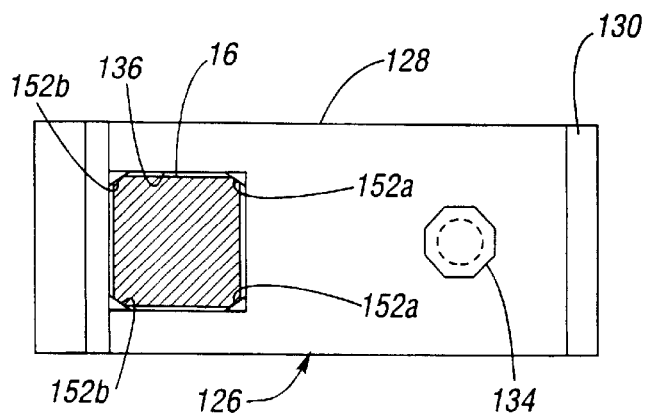
FIG. 12 is a partly sectional top view showing the second embodiment and a sensor body after displacement.
Figure 15:
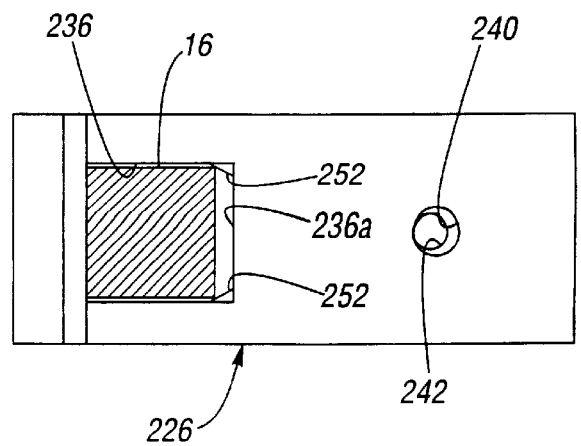
FIG. 15 is a partly sectional top view showing the third embodiment and a sensor body prior to displacement.

While it is possible for the first and second bracket components to be relatively displaced by the tapered bolt 34 in the manner described hereinbelow with respect to the second embodiment (see FIGS. 8 and 11), it is preferred for only the first bracket component 28 to be displaced by the tapered bolt, because only the first bracket component carries the teeth 52. Accordingly, the threaded shank 34a of the tapered bolt is passed freely through the off-set first and second bolt holes without displacing them, and then threaded into the threaded mounting hole 50. The neck 34b has a cross-section just less than that of the cross-section of the first bolt hole and larger than that of the second bolt hole. Thus, the neck 34b cannot pass through the off-set first bolt hole 40 without laterally displacing the first bracket component along the horizontal axis H into mutual alignment with the second bolt hole 42 (which is aligned with the threaded mounting hole 50).

As the tapered bolt 34 threads into the threaded mounting hole 50, the neck 34b encounters first bolt hole 40, whereupon the first bracket component is laterally displaced relative to the second bracket component along the horizontal axis H, wherein the first bracket component moves in the direction of arrow HL and the second bracket component, in this exampie, is stationary (although it also could alternatively be displaced in a horizontal direction opposite to arrow B). The lateral displacement of the first bracket component with respect to the second bracket component causes the first and second sensor openings to be relatively horizontally displaced. Accordingly, the approaching perimeter 36a of the first sensor opening 36 forcibly approaches the sensor body, whereby the teeth 52 cut into the sensor body 16. This tooth cutting creates a facial interaction between the teeth and the sensor body whereby a groove 56 (see FIG. 5) is cut into the sensor body which causes the sensor body to be moved vertically away from the reluctor 14 as the teeth slide along the grooves as they form, one groove, respectively, at each tooth.

As mentioned, the distance of movement of the sensor body along the vertical axis V is given bvy $D*\tan(A)=G$. wherein D is the relative displacement of the first bracket component 28 relative to the second bracket component 30 after the teeth 52 have engaged the sensor body 16 along the horizontal axis H, A is the pitch angle of the teeth 52, and G is the distance of movement of the sensor body along the vertical axis V which is equal to the desired optimum air gap.

FIGS. 7A and 7B depict operationally another form of displacement mechanism 54, wherein a toothed washer 58 enters into a smooth sidewall slot 60 of the first bracket component 28', wherein the teeth 62 of the toothed washer cut into the smooth sidewalls 64. The teeth cause the first bracket component 28' to be horizontally displaced (HD) along arrow HL relative to the second bracket component 30' based upon the movement (M) of the washer into the slot and the pitch (A')of the teeth, per the relation $HD=(M)*\tan(A')$, as the bolt 34' is tightened into the bolt hole 50'. Other displacement mechanisms which are within the ken of those skilled in the art may also be utilized.

Turning attention now to FIGS. 8 through 13B a second embodiment of the horizontal-mount bracket system 10' will be detailed.

The first bracket component 128 has a first sensor opening 136 and a first bolt hole 140. The second bracket component 130 has a second sensor opening 138 and a second bolt hole 142. The spacing between the first sensor opening 136 and the first bolt hole 140 is a first distance, and the spacing between the second sensor opening 138 and the second bolt hole 142 is a second distance, wherein the first and second distances are different by an offset distance D" (see FIG. 8). Preferably, the distal ends 144 (adjacent the first and second bolt holes) of the multi-component bracket 126 are free, while the near ends 146 (adjacent the first and second sensor openings) are vertically held but horizontally slidable, as for example by a fold-over 148 of the second bracket component with respect to the first bracket component. The first and second sensor openings mutually communicate and the first and second bolt holes mutually communicate, wherein initially the first and second sensor openings are mutually aligned sufficiently that the sensor body is vertically movable therein and the first and second bolt holes are mutually misaligned by an amount equal to the offset distance D". Preferably, the sensor body 16 is trapped and oriented with respect to the first and second sensor openings 136, 138, during manufacture. An abutment 148a serves to keep the sensor body vertically oriented during and after displacement of the first and second components.

The first sensor opening 136 is provided with an opposed pair of teeth 152a located at an approaching perimeter 136a thereof, and the second sensor opening 138 is provided with an opposed pair of teeth 152b located at an approaching perimeter 138a thereof. By the term "approaching permeter" is meant the perimeter of each of the respective first and second sensor openmgs which approaches the sensor body when the first and second brackets components are mutually displaced by a displacement mechanism 54. This displacement causes the first and second sensor openings to be horizontally displaced relative to each other, wherein the respective perimeters thereof forcibly abut respectively opposite sides of the sensor body, thereby causing the teeth 152a, 152b of the first bracket component 128 to cut into the softer sensor body 16. Because the teeth 152a, 152b both have the same predetermined pitch angle A relative to the horizontal axis (see FIG. 9B), the sensor body 16 is caused to move along the vertical axis V determined by the displacement D occurring after the teeth have engaged the sensor body.

The distance of movement of the sensor body along the vertical axis V is given by: $D*\tan(A)=G$, wherein D is the relative displacement of the first bracket component 128 with respect to the second bracket component 130 along the horizontal axis H after the teeth 152a, 152b have engaged the sensor bracket, A is the pitch angle of the teeth 152a, 152b, and G is the distance of movement of the sensor body along the vertical axis V which is equal to the desired optimum air gap.

Installation of the sensor body according to the second embodiment is as follows.

As shown at FIG. 8, the sensor body 16, tip 18 first, is placed into the sensor port 20 so that the tip comes to rest upon a surface of the reluctor 14. With the multi-component bracket 126 resting upon the honzontal surface 32, the first and second bolt holes 140, 142 are jointly placed over the threaded mounting hole. The first and second bolt holes are misaligned relative to each other by the offset distance D".

With the multi-component bracket 126 resting upon the horizontal surface 32, the first and second bolt holes 140, 142 are jointly placed over the threaded mounting hole, as shown at FIG. 8. The first and second bolt holes are misaligned relative to each other by the offset distance D", wherein the resulting misaligned cross-section is less than the cross-section of either of the first and second bolt holes. The threaded shank of a tapered bolt is passed freely through the off-set first and second bolt holes without displacing them, and then threaded into the threaded mounting hole 50. The tapered bolt 134 has a threaded shank 134*a*, a larger diameter neck 134*b* and a taper 134*c* therebetween. The neck 134*b* has a cross-section just less than that of the cross-section of either of the first and second bolt holes and larger than that of the misaligned cross-section. Accordingly, the neck 134*b* cannot pass through the off-set first and second bolt holes 140, 142 without laterally displacing them along the horizontal axis H into mutual alignment.

As the tapered bolt 134 threads into the threaded mounting hole 50, the neck 134*b* encounters first and second bolt holes 140, 142, whereupon they are laterally displaced relative to each other along a horizontal axis into mutual alignment, the first bracket member movable in the direction of arrow HL and the second bracket member movable in the opposite direction of arrow HR. The lateral displacement of the first bracket member with respect to the second bracket member causes the first and second sensor openings to be relatively horizontally displaced. Accordingly, the respective approaching perimeters 136*a*, 138*a* of the first and second sensor openings 136, 138 forcibly and opposably abut against the sensor body, whereby the teeth 152*a* and/or the teeth 152*b* cut into the sensor body 16. This tooth cutting creates a facial interaction between the teeth and the sensor body whereby grooves 156*a*, 156*b* (see FIG. 11) cut into the sensor body causes the sensor body to be moved vertically away from the reluctor 14 as the teeth slidingly follow into the forming groove at each tooth, respectively.

As mentioned, the distance of movement of the sensor body along the vertical axis V is given by: $D*\tan(A)=G$, wherein D is the relative displacement of the first bracket component 128 relative to the second bracket component 130 along the horizontal axis H after the teeth 152*a*, 152*b* have engaged the sensor body 16, A is the pitch angle of the teeth, and G is the distance of movement of the sensor body along the vertical axis V which is equal to the desired optimum air gap.

Figure 13A:
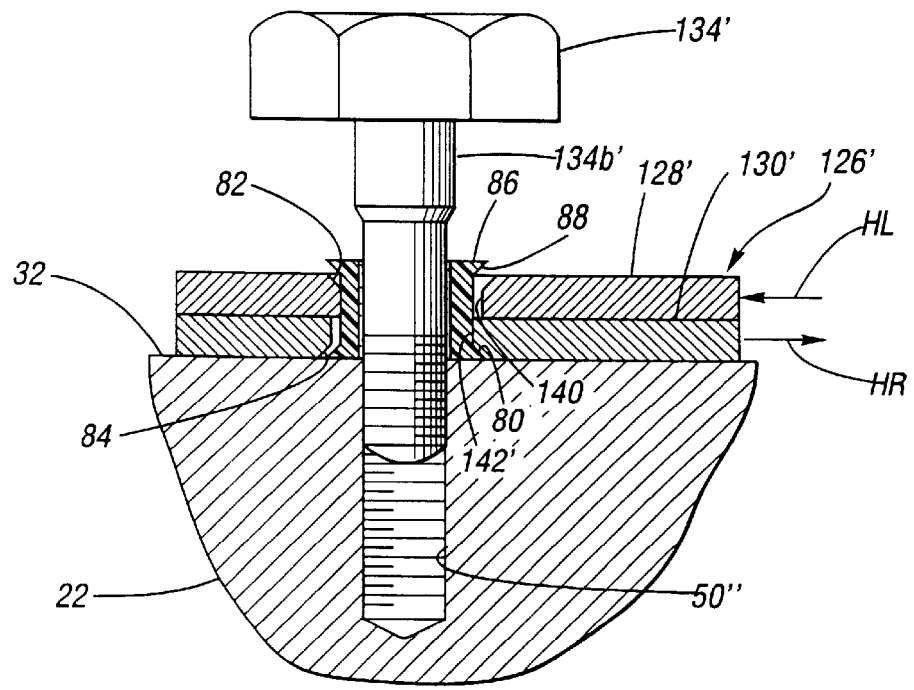
FIGS. 13A and 13B are partly sectional views of the first embodiment, wherein an alternative displacement retention feature is depicted.
Figure 13B:
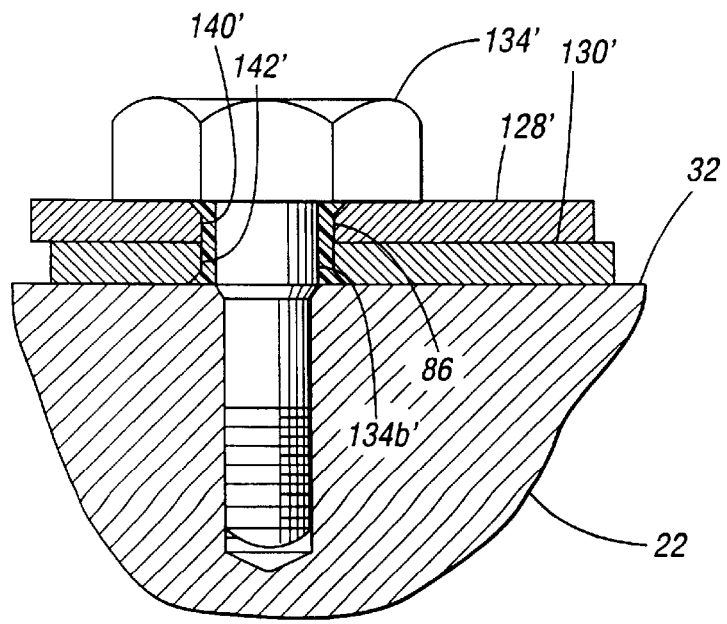

Turning attention now to FIGS. 13A and 13B an example of a methodology for retaining displacement of the first and second bracket components will be detailed.

The multi-component bracket 126' is generally as described above, having juxtaposed first and second bracket members 128', 130' having mutually comnnunicating first and second sensor openings and having first and second bolt holes 140', 142' which are offset at the threaded mounting hole 50" (see FIG. 13A), wherein now a sleeve 86 is located in each of the first and second bolt holes. The sleeve 86 preferably has upper and lower flared ends 88, 80 which are interferingiy interfaced with respectively opposing upper and lower chamfers 82, 84 of the multi-component bracket 126', thereby trapping the sleeve in the first and second bolt holes. The purpose of the sleeve 86 is to provide permanency to the displacement of the first and second bracket members (arrow directions HL, HR), in that the neck 134*b'* of the tapered bolt 134' will cause the sleeve to be permanently expanded when the tapered bolt is threaded into the threaded mounting hole 50".

Preferably, the deformation of the sleeve is laterally expansive and vertically compressive. In this regard the lower flared end 80 is flush with the second bracket member 130', and the upper flared end 88 is raised in relation to the first bracket member 128'. Accordingly, vertical compression of the sleeve occurs as the bolt 134' is threaded tight and the upper flared end 88 is deformed so as to become flush with the first bracket member 128'. The lateral expansion and vertical compression serve, respectively, to lock the sleeve horizontally and vertically with respect to the multi-component bracket 126'. In this form of the invention, the tapered bolt can be unthreaded, the multi-component bracket 126' then removed (with the sensor body 16 permanently engaged therewith via operation of the expanded sleeve), and then, when replaced, the sensor tip air gap G is again precisely restored.

Turning attention now to FIGS. 14 through 17 a third embodiment of the horizontal-mount bracket system 10" will be detailed.

The first bracket component 228 has a first sensor opening 236 and a first bolt hole 240. The second bracket component 230 has a second sensor opening 238 and a second bolt hole 242. The spacing between the first sensor opening 236 and the first bolt hole 240 is a first distance, and the spacing between the second sensor opening 238 and the second bolt hole 242 is a second distance, wherein the first and second distances are different by an offset distance D''' (see FIG. 14). Preferably, the distal ends 244 (adjacent the first and second bolt holes) of the muiti-component bracket 226 are free, while the near ends 246 (adjacent the first and second sensor openings) are restrained resiliently in the vertical direction but horzontally slidable, as for example by a resiliently deformable fold-over 248 of the second bracket component with respect to the first bracket component. The first and second sensor openings mutually communicate and the first and second bolt holes mutually communicate, wherein initially the first and second sensor openings are mutually aligned sufficiently that the sensor body is vertically movable therein and the first and second bolt holes are mutually misaligned by an amount equal to the offset distance D'''. Preferably, the sensor body 16 is trapped and oriented with respect to the first and second sensor openings 236, 238, during manufacture. An abutment 248*a* serves to keep the sensor body verticaily oriented during and after displacement of the first and second components.

The first sensor opening 236 is provided with a toothed member 252, such as an opposed pair of teeth or a tooth edge located at an approaching perimeter 236*a* thereof, wherein by "approaching perimeter" is meant the perimeter of the first sensor opening which approaches the sensor body when the first and second brackets components are mutually displaced by a displacement mechanism 54. This displacement causes the first and second sensor openings to be horizontally displaced relative to each other, wherein the respective perimeters thereof forcibly abut respectively opposite sides of the sensor body, thereby causing the toothed member 252 of the first bracket component 228 to cut into the softer sensor body 16 and thereby affix the sensor body to the first bracket component, wherein the sensor body must move vertically with the first bracket member.

The first and second bracket components 228, 230 are provided with an incline interface 278 having complementary inclined surfaces 280, 282, wherein as the approaching perimeter 236*a* is moved toward the sensor body 16 by the displacement mechanism 54, the first bracket component slides inclinably upward in the vertical direction away from the reluctor 14 (as shown comparatively between FIGS. 14 and 16).

Because the inclined surfaces 280, 282 have a predetermined pitch angle A relative to the horizontal axis (see FIG.

14A), the sensor body 16 is caused to move long the vertical axis V with the first bracket component determined by the pitch angle and the displacement D after the toothed member 252 has engaged the sensor body.

The distance of movement of the sensor body along the vertical axis V is given by: D*tan(A)=G. wherein D is the relative displacement of the first bracket component 228 relative to the second bracket component 230 along the horizontal axis H after the tooth member 252 has engaged the sensor body 16, A is the pitch angle of the inclined surfaces 280, 282, and G is the distance of movement of the sensor body along the vertical axis V which is equal to the desired optimum air gap.

Installation of the sensor body according to the first embodiment is as follows.

As shown at FIG. 14, the sensor body 16, tip 18 first, is placed into the sensor port 20 so that the tip comes to rest upon a surface of the reluctor 14. With the multi-component bracket 226 resting upon the horizontal surface 32, the first and second bolt holes 240, 242 are jointly placed over the threaded mounting hole. The first and second bolt holes are misaligned relative to each other by the offset distance D". The tapered bolt 234 has a threaded shank 234a, a larger diameter neck 234b and a taper 234c therebetween.

While it is possible for the first and second bracket components to be relatively displaced by the tapered bolt 234 in the manner described hereinbelow with respect to the second embodiment, it is preferred for only the first bracket component 228 to be displaced by the tapered bolt, because only the first bracket component carries the toothed member 252. Accordingly, the threaded shank of a tapered bolt is passed freely through the off-set first and second bolt holes without displacing them, and then threaded into the threaded mounting hole 50. The neck 234b has a cross-section just less than that of the cross-section of the first bolt hole and larger by the offset distance than that of the second bolt hole. Thus, the neck 234b cannot pass through the off-set first bolt hole 240 without laterally displacing the first bracket component along the horizontal axis H into mutual alignment with the second bolt hole 242 (which is aligned with the threaded mounting hole 50).

As the tapered bolt 234 threads into the threaded mounting hole 50, the neck 234b encounters first bolt hole 240, whereupon the first bracket component is laterally displaced relative to the second bracket component along the horizontal axis H, the first bracket component moving in the direction of arrow HL and the second bracket component, in this example, is stationary (although it also could alternatively be displaced in a direction opposite to arrow HL). The lateral displacement of the first bracket component with respect to the second bracket component causes the first and second sensor openings to be relatively horizontally displaced. Accordingly, the approaching penmeter 236a of the first sensor opening 236 forcibly approaches the sensor body, whereby the tooth member 252 cuts into the sensor body 16. This tooth cutting creates a facial interaction between the tooth member and the sensor body whereby the sensor body must move vertically with the first bracket member away from the reluctor 14 as the inclined surfaces 280, 282 slide in relation to each other.

As mentioned, the distance of movement of the sensor body along the vertical axis V is given by: D*tan(A)=G. wherein D is the relative displacement of the first bracket component 28 relative to the second bracket component along the horizontal axis H after the tooth member has engaged the sensor body 16, A is the pitch angle of the inclined surfaces 280, 282, and G is the distance of movement of the sensor body along the vertical axis V which is equal to the desired optimum air gap.

The terms "horizontal" and "vertical" are used herein merely as names for two orthogonal axes, and are not intended to literally signify orientation with respect to the Earth.

To those skilled in the art to which this invention appertains, the above described preferred embodiments may be subject to change or modification. For example, displacement modalities other than a tapered bolt and offset bolt hole combination may be used to accomplish lateral displacement of the bracket members of the multi-component bracket so as to cause holdable pinching of the sensor body with respect thereto. Further for example, other modalities may be used to lock the relative position of the first and second sensor openmigs after displacement, as for example an auxiliary locking screw or bolt passing through auxtliary aligned holes in the first and second bracket components after displacement. Such change or modification can be carried out without departing from the scope of the invention, which is intended to be limited only by the scope of the appended claims.

What is claimed is:

1. A method for setting and holding an air gap of a sensor tip of a sensor with respect to a reluctor using a multi-component horizontal-mount bracket comprising a first bracket component having a first opening and a second bracket component having a second opening, wherein the sensor has a sensor body, and wherein the reluctor is rotatable with respect to an engine housing, said method comprising the steps of:
    placing a sensor body of a sensor through the first and second openings of a multi-component horizontal-mount bracket;
    placing the sensor body into a sensor port of an engine housing, wherein the sensor tip contacts a reiuctor;
    horizontally displacing the first and second bracket components of the multi-component horizontal-mount bracket relative to each other to thereby cause a facial interaction between the sensor body and a first bracket component of the multi-component horizontal-mount bracket wherein the multi-component bracket inscribes the sensor body at an inclined angle relative to a horizontal axis, wherein the inscribing causes the sensor tip to move vertically away from the reluctor a distance equal to a predetermined air gap; and
    securing the multi-component horizontal-mount bracket to a horizontal surface connected with the engine housing to thereby secure the location of the sensor tip to the reluctor.

2. The method of claim 1, wherein said step of displacing permanently displaces said first and second openings.

3. The method of claim 1, wherein said steps of securing and horizontally displacing are performed simultaneously.

4. A method for setting and holding an air gap of a sensor tip of a sensor with respect to a reluctor using a multi-component horizontal-mount bracket comprising a first bracket component having a first opening and a second bracket component having a second opening, wherein the sensor has a sensor body, and wherein the reluctor is rotatable with respect to an engine housing, said method comprising the steps of:

placing a sensor body of a sensor through the first and second openings of a multi-component bracket horizontal-mount;

placing the sensor body into a sensor port of an engine housing, wherein the sensor tip contacts a reluctor;

horizontally displacing the first and second bracket components of the multi-component horizontal-mount bracket relative to each other to thereby cause a facial interaction between the first bracket component and the sensor body such that the sensor body is constrained to move vertically therewith, and further to thereby cause the first bracket component to inclinably slide relative to the second bracket component so as to vertically move the sensor tip vertically away from the reluctor a distance equal to a predetermined air gap; and securing the multi-component horizontal-mount bracket to a horizontal surface connected with the engine housing to thereby secure the location of the sensor tip to the reluctor.

5. The method of claim 4, wherein said step of displacing permanently displaces said first and second openings.

6. The method of claim 4, wherein said steps of securing and horizontally displacing are performed simultaneously.

* * * * *